United States Patent
Kubota (10) Patent No.: US 9,766,872 B2
(45) Date of Patent: Sep. 19, 2017

(54) INFORMATION PROCESSING DEVICE EXECUTING COMMUNICATION PROCESSING WITH EXTERNAL DEVICE, AND METHOD AND SYSTEM FOR THE SAME

(71) Applicant: BROTHER KOGYO KABUSHIKI KAISHA, Nagoya, Aichi (JP)

(72) Inventor: Hirotaka Kubota, Nagoya (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 28 days.

(21) Appl. No.: 15/054,188

(22) Filed: Feb. 26, 2016

(65) Prior Publication Data
US 2016/0253161 A1 Sep. 1, 2016

(30) Foreign Application Priority Data

Feb. 27, 2015 (JP) .................................. 2015-039385

(51) Int. Cl.
G06F 9/445 (2006.01)
H04L 29/08 (2006.01)

(52) U.S. Cl.
CPC ................ G06F 8/61 (2013.01); H04L 67/06 (2013.01); H04L 67/1097 (2013.01); H04L 67/34 (2013.01)

(58) Field of Classification Search
None
See application file for complete search history.

(56) References Cited

U.S. PATENT DOCUMENTS

2008/0077915 A1* 3/2008 Kahan ...................... G06F 8/60
717/178
2008/0134186 A1* 6/2008 Sakai .................... G06F 21/608
718/102

(Continued)

FOREIGN PATENT DOCUMENTS

JP 2010-238100 A 10/2010

OTHER PUBLICATIONS

Brother, "A printing app for your Apple, Android, Kindle Fire or Windows Phone mobile device." Brother USA, Feb. 6, 2014, web.archive.org/web/20140206155843/http://www.brother-usa.com:80/downloads/ printing-appFAQs.aspx. Accessed May 14, 2017.*

(Continued)

Primary Examiner — Wei Zhen
Assistant Examiner — Binh Luu
(74) Attorney, Agent, or Firm — Scully, Scott, Murphy & Presser, PC (57) ABSTRACT

An information processing device may obtain, from a target object, first access information and first information. The information processing device may send the obtained first information to a first server. The information processing device may receive, from the first server, identification information unique to the first information and second access information. The information processing device may store the received identification information in a storage and send an access request information to a second server. The information processing device may download an application program from the second server, install the application program, and accept an instruction for activating the application program. The information processing device may send the identification information to the first server and receive the first information from the first server. The (Continued)

information processing device may establish a connection with the external device by using the first information and execute a communication processing.

12 Claims, 5 Drawing Sheets

(56) References Cited

U.S. PATENT DOCUMENTS

| | | | | |
|---|---|---|---|---|
| 2010/0245909 A1* | 9/2010 | Yamaguchi | ............ | G06F 3/1204 358/1.15 |
| 2011/0185354 A1* | 7/2011 | Tanner | ...................... | G06F 8/61 717/178 |
| 2014/0059536 A1* | 2/2014 | Hiratsuka | ................. | G06F 8/61 717/178 |
| 2014/0181801 A1* | 6/2014 | Voronkov | ................. | G06F 8/63 717/177 |
| 2014/0337831 A1* | 11/2014 | Katagai | ................... | H04L 67/34 717/178 |
| 2016/0350041 A1* | 12/2016 | Katano | ................. | G06F 3/1236 |

OTHER PUBLICATIONS

Brother, "Mobile Device Printing and Scanning." Brother USA, Apr. 4, 2014, web.archive.org/web/20140404004431/http://www.brother-usa.com:80/connect/mobile/. Accessed May 14, 2017.*

Dell, "Easy-to-use wireless multifunction printer offering great value to small businesses." Dell, Jul. 2013, www.dell.com/downloads/global/products/print/en/dell_b1163w_brochure_us.pdf. Accessed May 14, 2017.*

Xerox, "Xerox Mobile Print Portal." Xerox, Feb. 2015, download.support.xerox.com/pub/docs/Mobileprintportal/userdocs/any-os/en_GB/Xerox_MobilePrintPortal_UserGuide_iOS_v3_0_1_EN.pdf. Accessed May 14, 2017.*

* cited by examiner

```
HTTP/1.1 302 Found
Date: Tue, 24 Feb 2015 03:22:52 GMT
Server: Apache
Set-Cookie: clientid=generated_client_id    ~- I1
Location: https://play.google.com/store/apps/details?id=app1   ~- I2
Content-Length: 345
Content-Type: text/html; charset=iso-8859-1
```

FIG. 6

```
GET /app1 HTTP/1.1
Accept: text/html, image/gif, image/jpeg, */*
Accept-Language: ja
Accept-Encoding: gzip, deflate
User-Agent: xxx
Host: tempserv1   ~- I3
Cookie: clientid=generated_client_id   ~- I4
```

INFORMATION PROCESSING DEVICE EXECUTING COMMUNICATION PROCESSING WITH EXTERNAL DEVICE, AND METHOD AND SYSTEM FOR THE SAME

CROSS-REFERENCE TO RELATED APPLICATION

This application claims priority to Japanese Patent Application No. 2015-039385, filed on Feb. 27, 2015, the contents of which are hereby incorporated by reference into the present application.

TECHNICAL FIELD

The technique disclosed in the present specification relates to an information processing apparatus a method, and a communication system that are capable of suitably performing a data communication.

DESCRIPTION OF RELATED ART

An information processing device is known which is capable of receiving various information from a specific device by performing a near field wireless communication or by performing an image analysis of code photographed using a camera unit. Further, an information processing device is known which is capable of receiving access information from a specific device, and using the received information to access a web server via the Internet using the received information. The information processing device receives access information and setting information from the specific device by using the near field wireless communication described above. The information processing device uses the received information to access a web server storing an application program, and downloads the application program to the information processing device. Further, when the information processing device starts the application program installed on the information processing device, the application program uses the setting information to communicate with an external device.

SUMMARY

However, in a case where the setting information is information having a format which can be handled only by the application program, the information processing device cannot store the setting information unless the application program has been installed on the information processing device. Thus, in a communication process using a near field wireless communication performed before installation of the application program, the information processing device receives and stores only the access information. As a result, in order to store the setting information, the information processing device must, after installation of the application program has been completed, again perform a communication process using the near field wireless communication to re-receive the setting information, thus decreasing user convenience.

One technique disclosed in the present application is an information processing device. The information processing device may comprise: a communication interface configured to communicate with a first server, a second server that stores an application program, and an external device; a storage; a processor coupled to the communication interface; and a memory storing computer-readable instructions. The computer-readable instructions, when executed by the processor, may cause the information processing device to perform obtaining, from a target object, first access information and first information, the first access information indicating a location of the first server. The computer-readable instructions may cause the information processing device to perform sending the obtained first information to the first server via the communication interface, using the first access information as a sending target. The computer-readable instructions may cause the information processing device to perform receiving, from the first server via the communication interface, identification information and second access information in response to sending the first information to the first server, the identification information being unique to the first information, the second access information indicating a location of the second server. The computer-readable instructions may cause the information processing device to perform storing the received identification information in the storage. The computer-readable instructions may cause the information processing device to perform sending an access request information to the second server via the communication interface, using the second access information. The computer-readable instructions may cause the information processing device to perform downloading the application program from the second server via the communication interface after sending the access request information. The computer-readable instructions may cause the information processing device to perform installing the application program that has been downloaded. The computer-readable instructions may cause the information processing device to perform accepting an input of an instruction for activating the application program that has been installed. The computer-readable instructions may cause the information processing device to perform sending the identification information that has been stored in the storage to the first server via the communication interface, using the first access information. The computer-readable instructions may cause the information processing device to perform receiving, from the first server via the communication interface, the first information unique to the identification information in response to sending the identification information to the first server. The computer-readable instructions may cause the information processing device to perform establishing a connection with the external device, by using the first information, by the application program. The computer-readable instructions may cause the information processing device to perform executing a communication processing by using the established connection.

EMBODIMENT (Configuration of Communication System)

Figure 1:
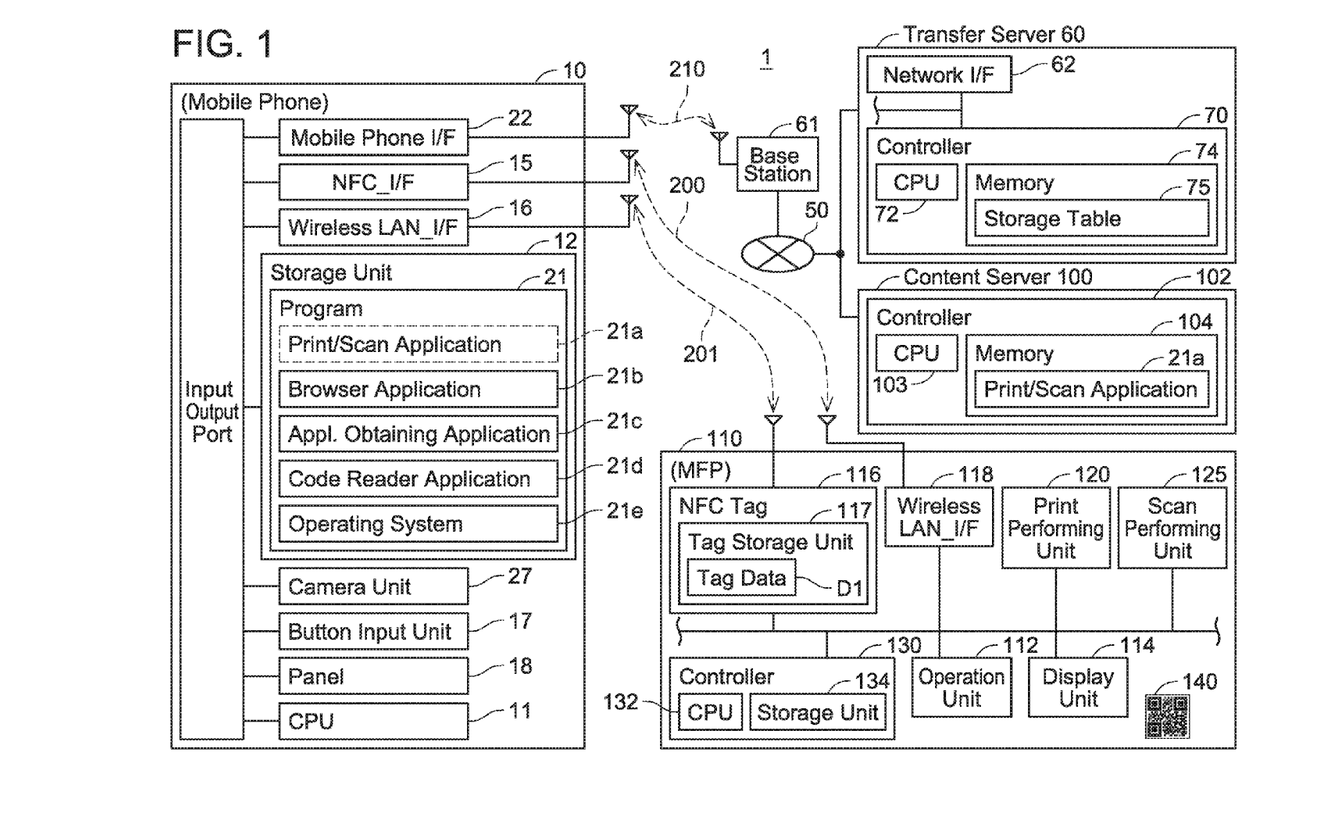
FIG. 1 shows a block diagram of a communication system.

FIG. 1 shows a block diagram of a communication system 1 illustrated as an embodiment of the present application. The communication system 1 comprises a mobile phone 10, an MFP (referred to as Multifunction Peripheral) 110, a base station 61, a transfer server 60, and a content server 100. The transfer server 60 and the content server 100 are capable of communicating with the mobile phone 10 via Internet 50 and the base station 61. Further, the MFP 110 is capable of communicating with the mobile phone 10 via a wireless communication 201.

(Configuration of Mobile Phone 10)

The mobile phone 10 is a mobile phone equipped with an Android (registered trademark of Google Inc.) platform. The mobile phone 10 mainly comprises a CPU 11, a storage unit 12, an NFC (referred to as Near Field Communication) interface unit 15, a wireless LAN (referred to as Local Area Network) interface unit 16, a button input unit 17, a panel 18, a mobile phone interface unit 22, and a camera unit 27. The CPU 11 controls each function in accordance with a program stored in the storage unit 12, and various signals, etc. sent and received via the NFC_I/F 15. Further, the CPU 11 functions as various means by executing the program. In the present specification, interface unit may be referred to as "I/F".

The storage unit 12 stores a program 21. Moreover, the storage unit 12 may be configured by combining a RAM (referred to as Random Access Memory), ROM (referred to as Read Only Memory), flash memory, HDD (referred to as hard disk drive), etc. The storage unit 12 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

The program 21 comprises a print/scan application 21a, a browser application 21b, an appl. obtaining application 21c, a code reader application 21d, and an operating system 21e (called OS21e below). The OS21e is an Android platform OS. The print/scan application 21a through the code reader application 21d are each an application for Android.

The print/scan application 21a is an application for causing the MFP 110 to execute a print process or scan process. When the user uses the print/scan application 21a to execute the print process, the mobile phone 10 sends print data to the MFP 110. The MFP 110 executes a print using the received print data. When the user uses the print/scan application 21a to execute the scan process, the MFP 110 generates scan data by scanning a document, and sends the generated scan data to the mobile phone 10. The print/scan application 21a may be an application provided by the vendor of the MFP 110.

The print/scan application 21a is not initially stored in the storage unit 12. In S100, to be described, the print/scan application 21a is stored in the storage unit 12 by the print/scan application 21a being installed on the mobile phone 10. In FIG. 1, the broken line indicating the print/scan application 21a indicates that "initially, the print/scan application 21a is not being stored, but is later installed and stored in the storage unit 12".

The browser application 21b is an application for causing the panel 18 to display web data received from a web server such as the content server 100. The browser application 21b has the standard equipment of a cookie function. The cookie function is a function for causing a website provider to temporarily store data in a client computer via the browser application 21b.

The appl. obtaining application 21c is an application for executing a process to receive various application programs such as the print/scan application 21a, etc. from the content server 100.

The code reader application 21d is an application for receiving data embedded in a code by photographing the code using the camera unit 27. An example of a code is a QR code (registered trademark of Denso Wave Incorporated).

The OS21e is a program that provides basic functions used in common in the print/scan application 21a through the code reader application 21d. Further, the OS21e manages the transfer of data between each of the print/scan application 21a through the code reader application 21d.

Further, the OS21e executes various processes based on various data received via the NFC_I/F 15, the wireless LAN_I/F 16, the mobile phone I/F 22, etc. or various data received by the code reader application 21d.

The NFC_I/F 15 has an IC chip including a communication circuit, and executes a wireless communication 200 (called "NFC communication 200" below) in accordance with the NFC technique for so-called near field wireless communication. The NFC technique is a wireless communication procedure based on, e.g., international standard ISO/IEC 21481 or 18092. The NFC_I/F 15 automatically executes a near field wireless communication in response to distance from an NFC tag becoming within a predetermined distance (e.g., 10 cm), and receives data from the NFC tag. In the present embodiment, the MFP 110 comprises an NFC tag 116. Therefore, the NFC communication 200 between the NFC_I/F 15 and the NFC tag 116 is executed automatically by the user bringing the mobile phone 10 close to the MFP 110. As a result, the mobile phone 10 receives various information from the MFP 110.

The mobile phone I/F 22 has an IC chip including a communication circuit, and executes a wireless communication 210 with the base station 61. The wireless communication 210 may be a cellular scheme wireless communication such as 3G, 4G, etc. The mobile phone 10 is connected to the Internet 50 via the mobile phone I/F 22 and the base station 61.

The wireless LAN_I/F 16 has an IC chip including a communication circuit, and executes the wireless communication 201 (called "Wi-Fi communication 201" below) in accordance with the Wi-Fi (registered trademark of Wi-Fi Alliance) technique. The Wi-Fi technique is a wireless communication procedure based on, e.g., IEEE (referred to as The Institute of Electrical and Electronics Engineers, Inc.) standard 802.11 or standards conforming thereto (e.g., 802.11a, 11b, 11g, 11n, etc.). The wireless LAN_I/F 16 may be an I/F for executing a wireless communication via an access point (i.e., infrastructure mode wireless communication), or may be an I/F for executing a wireless communication not via an access point (e.g., an ad hoc mode wireless communication, a Wi-Fi Direct (registered trademark of Wi-Fi Alliance) technique wireless communication).

The button input unit 17 is a key for executing the functions of the mobile phone 10. The panel 18 may be formed integrally with the button input unit 17 as a touch panel. The panel 18 displays various function information of the mobile phone 10. The camera unit 27 is a part for generating image data by photographing an object.

(Configuration of MFP 110)

The MFP 110 is a multi-function peripheral device comprising a printer function, scanner function, copy function, facsimile function, etc. The MFP 110 comprises an operation unit 112, a display unit 114, the NFC tag 116, a wireless LAN interface unit 118, a print performing unit 120, a scan performing unit 125, a controller 130, and code 140. Each unit 112 to 130 is connected to a bus line (reference number omitted).

The NFC tag 116 is a device for executing the NFC communication 200 with the NFC_I/F 15. The NFC tag 116 may be disposed, for example, on a front face of a housing of the MFP 110. The NFC tag 116 comprises a tag storage unit 117. The tag storage unit 117 is a non-volatile storage unit. The tag storage unit 117 stores tag data D1. The tag data D1 is data to be sent to the NFC_I/F 15 in a case where a communication between the NFC tag 116 and the NFC_I/F 15 was executed. The tag data D1 may include a URL (referred to as Uniform Resource Locator) starting with "http://". Thus, the mobile phone 10 that has received the tag data D1 can access the transfer server 60 based on the URL.

First access information and connection information are included in the tag data D1. The first access information is URL information indicating location of the transfer server 60. The connection information is information used when a communication process with the MFP 110 is to be executed by using the print/scan application 21a. The connection information, specifically, includes an SSID (referred to as Service Set Identifier) and password used for executing the Wi-Fi communication 201 using Wi-Fi Direct. The connection information may be data based on specific international standards, or may be data having a unique standard defined by the vendor of the MFP 110.

The code 140 represents various data in a graphic pattern. The code 140, may be printed, for example, on the front face of the housing of the MFP 110.

The operation unit 112 comprises a plurality of keys. The user can provide various instructions to the MFP 110 by operating the operation unit 112. The display unit 114 is a display for displaying various information. The print performing unit 120 is an ink jet scheme, laser scheme, etc. printing mechanism. The scan performing unit 125 is a mechanism for generating scan data by scanning a document. The configuration of the wireless LAN_I/F 118 is the same as the configuration of the wireless LAN_I/F 16, described earlier, and a description thereof is therefore omitted here.

The controller 130 comprises a CPU 132 and a storage unit 134. The CPU 132 is a processor which performs various processes in accordance with a program (not shown) stored in the storage unit 134. The storage unit 134 is configured by a RAM, ROM, etc. The storage unit 134, like the storage unit 12, may be a computer readable storage medium.

(Configuration of Content Server 100)

The content server 100 is a server for storing various application programs to be installed on the mobile phone 10. The user of the mobile phone 10 can select an application program suitable for intended use, and download it from the content server 100. The content server 100 may be a server provided by the vendor of the Android platform.

The content server 100 comprises a controller 102. The controller 102 comprises a CPU 103 and a memory 104. The print/scan application 21a is stored in the memory 104. The user of the mobile phone 10 can download the print/scan application 21a from the content server 100 and install it on the mobile phone 10, as described later in S93 to S100. Thus, the print/scan application 21a can be stored in the storage unit 12. Moreover, the print/scan application 21a may be stored in the memory 104 in a compressed state, or may be stored in the storage unit 12 in a decompressed state.

(Configuration of Transfer Server 60)

The transfer server 60 exists separately from the content server 100, and temporarily stores the connection information. The transfer server 60 may be provided by the vendor of the MFP 110. The transfer server 60 comprises a network interface 62 and a controller 70.

The controller 70 comprises a CPU 72 and a memory 74. Like the memory 104, the memory 74 may be a computer readable storage medium. A storage table 75 is stored in the memory 74. As described later in S45 and S140, the storage table 75 is a storage area for storing the connection information and client ID in association with one another.

In the ensuing explanation, the CPU 11 to execute programs such as applications and OS21e is sometimes simply referred to by the program name. For example, the indication of "the print/scan application 21a" may mean "the CPU 11 that executes the print/scan application 21a". In the present specification, the description "the CPU 11 of the mobile phone 10 receives various types of information" includes the technical meaning "the CPU 11 of the mobile phone 10 receives various types of information via the mobile phone I/F 22 or the NFC_I/F 15, etc.". Further, the description "the CPU 11 of the mobile phone 10 transmits various types of information" includes the technical meaning "the 11 of the mobile phone 10 outputs various types of information via the mobile phone I/F 22 or the NFC_I/F 15, etc.".

(Operation of Communication System 1)

The operation of the communication system 1 according to the present embodiment will be described using the sequence diagrams of FIG. 2 to FIG. 4. In the description of the present embodiment, a case is described in which the print/scan application 21a has not been installed on the mobile phone 10. Further, a case is described in which the contents of the tag data D1 stored in the tag storage unit 117 of the NFC tag 116 is "http://tempserv1/app1?action=connect&ssid=xxx&password=yyy". Here, "tempserv1" is an identifier for distinguishing the transfer server 60, which is the host, on the Internet. "app1" is an identifier for identifying the print/scan application 21a. "action=connect" is a character string that indicates a parameter for connection. "ssid=xxx" is information indicating that an SSID to be used for executing the Wi-Fi communication 201 is "xxx". "password=yyy" is information indicating that a password to be used for executing the Wi-Fi communication 201 is "yyy". Moreover, "tempserv1" corresponds to the first access information. "ssid=xxx" and "password=yyy" correspond to the connection information.

When the user brings the mobile phone 10 close to the vicinity of the NFC tag 116 of the MFP 110, in S10 the OS21e starts the NFC communication 200. In S15, the OS21e receives the tag data D1 stored in the tag storage unit 117 via the NFC_I/F 15.

In S20, the OS21e determines whether the received tag data D1 is data in URI format. In case of a negative determination (S20: NO), the flowchart is ended and, in case of a positive determination (S20: YES), the process proceeds to S25.

In S25, the OS21e sends a start instruction and the tag data D1 to the browser application 21b. As described earlier, the contents of the tag data D1 is "http://tempserv1/app1?action=connect&ssid=xxx&password=yyy". That is, the tag data D1 is data in URI format. Further, the tag data D1 includes "tempserv1", which is the first access information, and "ssid=xxx", "password=yyy", which is the connection information.

In S30, the browser application 21b executes an initialization process in response to receiving the start instruction from the OS21e. As a result, the browser application 21b becomes available. In S35, the browser application 21b sends the tag data D1 to the transfer server 60, which is a first access information destination.

In S38, the transfer server 60 extracts the connection information from the tag data D1. In the description of the present embodiment, the information "ssid=xxx" and "password=yyy" is extracted as the connection information.

In S40, the transfer server 60 generates the client ID. The client ID is information unique to the connection information extracted in S38. That is, the client ID functions as an identifier for identifying the connection information. In S45, the transfer server 60 stores the connection information extracted in S38, and the client ID generated in S40, in association with one another in the storage table 75.

In S50, the transfer server 60 generates cookie information including the client ID, and second access information. The cookie information is information included in an HTTP response header. In the description of the present specification, the cookie information is generated by including the client ID in the HTTP response header. The second access information is information indicating the location of the content server 100. The second access information may include the URL of the content server 100. The second access information is used, by the browser application 21b in the client, to redirect to the content server 100.

Figure 5:
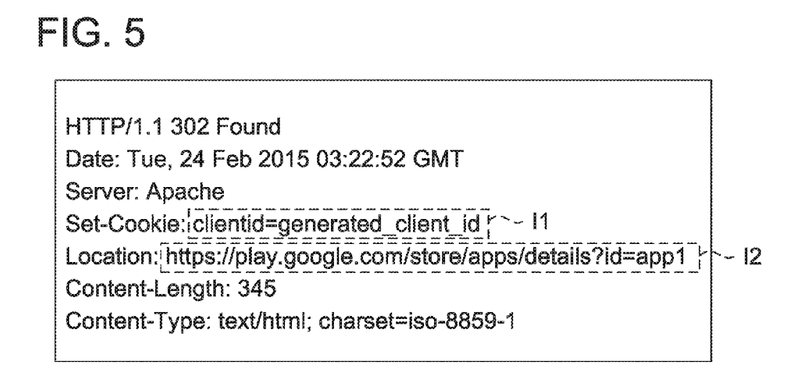
FIG. 5 shows a diagram of an example of an HTTP response header.

FIG. 5 shows an example of the HTTP response header. Cookie information I1, and second access information I2 are included in the header. The cookie information I1 comprises a set of Key and Value. The character string "clientid" included in the cookie information I1 corresponds to the Key, and indicates the client ID. The character string "generated_client_id" included in the cookie information I1 corresponds to the Value. "generated_client_id" is a character string generated randomly by the transfer server 60. Further, the character string "app1" included in the second access information I2 is an identifier of the print/scan application 21a.

In S55, the transfer server 60 sends the cookie information and the second access information to the browser application 21b. In S60, the browser application 21b stores the received cookie information in the storage unit 12 in association with the first access information (i.e., transfer server URL). In the description of the present embodiment, the cookie information which includes the client ID is stored in the storage unit 12 in association with the first access information "http://tempserv1". That is, the cookie information is stored in each server domain. Further, the cookie information is stored in the storage unit 12 in a set of Key and Value.

In S70, the browser application 21b sends an access request to the content server 100 based on the received second access information. In S75, the browser application 21b receives service screen information from the content server 100. In S80, the browser application 21b displays a service screen on the panel 18 based on the service screen information. The service screen is a screen for accepting an operation to select a program, from among various application programs, to be installed on the mobile phone 10.

In S85, the browser application 21b accepts input from the user relating to a selection instruction and installation instruction of the application program. In the description of the present embodiment, the case will be described in which the user of the mobile phone 10 selected the print/scan application 21a.

In S90, the browser application 21b sends an installation request requesting the print/scan application 21a to the content server 100. In S93, the browser application 21b receives the print/scan application 21a from the content server 100. In S95, the browser application 21b transfers the received print/scan application 21a to the OS21e. In S100, the OS21e installs the received print/scan application 21a in the storage unit 12.

In S105, the OS21e accepts input of a start instruction of the print/scan application 21a. For example, the OS21e accepts the input of the start instruction in response to the user touching a start button of the print/scan application 21a displayed on the panel 18. When accepting the input of the start instruction, in S115 the OS21e sends the start instruction to the print/scan application 21a.

In S118, the print/scan application 21a performs an initialization process in response to receiving the start instruction from the OS21e. As a result, the print/scan application 21a becomes available.

In S120, the print/scan application 21a generates a print/scan application URI. The print/scan application URI is data in URI format indicating the location of the print/scan application 21a.

In S125, the print/scan application 21a sends a start instruction, the print/scan application URI, and the first access information (i.e., transfer server URL) to the browser application 21b. The start instruction is an instruction requesting to "open" the URL indicated by the first access information. Specific internal operations will be described. When the start instruction is output from the print/scan application 21a, the OS21e selects and starts an application capable of opening the URL indicated by the first access information. In the present description, the OS21e selects and starts the browser application 21b. Further, in the description of the present embodiment, the case is described in which "http://tempserv1/app1?action=connect&callback=app1://connect" is sent as the information including the first access information and the print/scan application URI. Here, "tempserv1" corresponds to the first access information, and "app1" corresponds to the print/scan application URI.

In S128, the browser application 21b executes the initialization process in response to receiving the start instruction from the print/scan application 21a. In S130, the browser application 21b reads, from the storage unit 12, the cookie information stored in the storage unit 12 in association with "http://tempserv1", which is the first access information. In S133, the browser application 21b extracts the client ID from the read cookie information.

The specific method for extracting the client ID will be described. The cookie information has been stored as the set of Key and Value in the storage unit 12, as described in S60. When a website is to be accessed based on any server domain, the browser application 21b determines whether that server domain is being stored in the storage unit 12. In a case where the server domain is being stored, the cookie information (i.e., the set of Key and Value) stored in the storage unit 12 corresponding to the server domain is read. Then, the client ID is identified by extracting the character string equivalent to the Key from the read cookie information.

In S135, the browser application 21b sends, to the transfer server 60, the print/scan application URI, the first access information, redirect information, and the client ID extracted in S133. The print/scan application URI is information indicating the location of the print/scan application 21a. The redirect information is information for instructing the transfer server 60 to set a redirect destination to the print/scan application 21a. In other words, the redirect information is information for designating in advance the print/scan application 21a as an application for executing a process based on the connection information.

The print/scan application URI, the first access information and the redirect information may be sent as data in URI format. In the description of the present embodiment, the case is described in which the URI format data structure sent in S135 is "http://tempserv1/app1?action=connect&callback=app1://connect". Here, "app1://connect" corresponds to the print/scan application URI. "http://tempserv1" corresponds to the first access information. "callback=app1://connect" corresponds to the redirect information.

Figure 6:
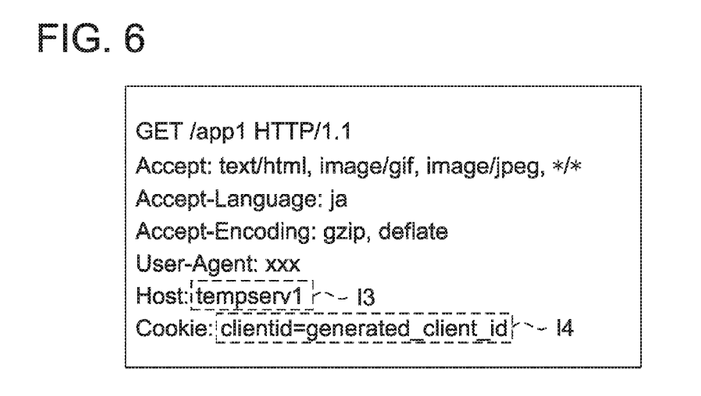
FIG. 6 shows a diagram of an example of an HTTP request header.

Further, in S135, the client ID is sent in a state of being included in a HTTP request header. The HTTP request is used when the transfer server 60 is accessed by the browser application 21*b*. FIG. 6 shows an example of the HTTP request header. A transfer server domain 13 and cookie information 14 are included in the header. The cookie information 14 comprises a set of Key and Value. The character string "clientid" included in the cookie information 14 corresponds to the Key, and indicates the client ID. The character string "generated_client_id" included in the cookie information 14 corresponds to the Value. The character string "generated_client_id" is a random character string generated by the transfer server 60 in S50.

In S140, the transfer server 60 reads, from the storage table 75, the connection information based on the client ID included in the received cookie information. Specifically, it is searched whether an ID the same as the client ID included in the cookie information received in S135 is being stored in the storage table 75. Further, in a case where it is determined that the same ID is being stored in the storage table 75, the transfer server 60 determines whether the Value generated by the transfer server 60 in S50, and the Value received in S135 match. In a case where both Values match, it is possible to confirm that the client which accessed the transfer server 60 in the past in S35 is the same as the client accessing the transfer server 60 this time in S135. That is, it is possible to perform, using the Values, an authenticity determination of the client which deposited the connection information in the transfer server 60 in the past, and the client which has come this time to the transfer server 60 to retrieve the connection information. In a case of confirming access by an authorized client, the transfer server 60 receives the connection information associated with the client ID received in S135.

In S145, the transfer server 60 sends the redirect information including the connection information to the browser application 21*b*. The redirect information may be configured by data in URI format. In the description of the present embodiment, a case is described in which the data structure of the redirect information is "app1://connect?ssid=xxx&password=yyy". Here, "app1://connect" means sending the redirect information to the print/scan application 21*a*. Further, "ssid=xxx&password=yyy" corresponds to the connection information.

In S150, the browser application 21*b* sends the redirect information received in S145 to the print/scan application 21*a*. In S153, the print/scan application 21*a* extracts "ssid=xxx&password=yyy", which is the connection information, from the redirect information. Then, the print/scan application 21*a* stores the extracted connection information in the storage unit 12.

In S155, the print/scan application 21*a* notifies the user that operation is occurring based on the contents of the tag data D1 loaded in the NFC touch operation (S15) which was executed before the installation process (S100). For example, the print/scan application 21*a* displays, on the panel 18, a character string such as "Operating based on instruction received by NFC touch operation".

In S160, the print/scan application 21*a* establishes the Wi-Fi communication 201 with the MFP 110 based on the connection information being stored in the storage unit 12. In S165, the print/scan application 21*a* sends print data to the MFP 110 via the Wi-Fi communication 201.

In S170, the MFP 110 executes a print process using the print data sent from the print/scan application 21*a*. As a result, the flow ends.

(Effect)

The mobile phone 10 receives the URI format tag data D1 including the first access information and the connection information from the MFP 110 by using the NFC communication 200 (S15). Specifically, the tag data D1 "http://tempserv1/app1?action=connect&ssid=xxx&password=yyy" is received (S15). Here, "tempserv1" corresponds to the first access information, and "ssid=xxx&password=yyy" corresponds to the connection information. In a case where the print/scan application 21*a* is not yet installed in the storage unit 12, the OS21*e* processes the URI format tag data D1. However, in case of processing the data in URI format, the OS21*e* may be set so as to be capable only of executing an operation to access a web page using the browser application 21*b*. Thus, the problem occurs that, in a state where the print/scan application 21*a* is not yet installed, the mobile phone 10 cannot receive the connection information "ssid=xxx&password=yyy" included in the tag data D1. One method to avoid this problem is to receive the tag data D1 by re-executing the NFC communication 200 after having installed (S100) the print/scan application 21*a* in the storage unit 12. In this case, since the print/scan application 21*a* can execute processing of the URI format tag data D1, it is possible to receive the connection information. However, in this method, since the NFC communication 200 must be executed twice, before and after the installation process of the print/scan application 21*a*, convenience for the user is decreased.

On the other hand, the mobile phone 10 disclosed in the present specification transfers (S35) the tag data D1 received (S15) from the MFP 110 to the transfer server 60 in a state in which the print/scan application 21*a* is not yet installed in the storage unit 12. Then, the transfer server 60 extracts the connection information from the tag data D1 (S38), and temporarily stores the connection information in the transfer server 60 (S45). Further, the mobile phone 10 receives, from the transfer server 60, the client ID unique to the connection information being stored in the transfer server 60, and stores the client ID in the storage unit 12 (S60). By sending the client ID stored in the storage unit 12 to the transfer server 60 (S135) after having installed the print/scan application 21*a* in the storage unit 12 (S100), the mobile phone 10 receives the connection information stored in the transfer server 60 from the transfer server 60 (S145), and stores the received connection information in the storage unit 12 (S153). When starting the print/scan application 21*a*, the mobile phone 10 executes a communication process with the MFP 110 (S165) by using the connection information stored in the storage unit 12. As a result, even in the case where the print/scan application 21*a* is not yet installed in the storage unit 12, the mobile phone 10 can receive (S145) the connection information needed for a communication with the MFP 110 merely by executing the one NFC communication 200 (S15) with the MFP 110, increasing convenience for the user.

The mobile phone 10 described in the present specification stores the client ID in the storage unit 12 (S60) by using the cookie function provided in the browser application 21*b*. The cookie function is a well-known function which is standard in the browser application 21*b*. Since the cookie function, which is a standard function, is appropriated as a function for storing the client ID in the storage unit 12, it is not necessary to provide the mobile phone 10 with a dedicated function for storing the client ID in the storage unit 12. It is possible to simplify the configuration of the mobile phone 10.

The mobile phone 10 described in the present specification sends the redirect information together with the client ID to the transfer server 60 (S135). Then, the transfer server 60 sends the redirect information including the connection information to the print/scan application 21a (S145, S150). The print/scan application 21a executes the print process by using the connection information included in the redirect information (S165). That is, when the client ID is to be sent to the transfer server 60 (S135), the mobile phone 10 designates, in advance, the print/scan application 21a as the application for executing the print process (S165) based on the connection information. Therefore, it becomes possible to reliably execute the process based on the connection information by using the application program.

According to the mobile phone 10 described in the present specification, data including the first access information (i.e., transfer server URL) and the connection information is written in URI format, which is a commonly used data format. As a result, it becomes possible to make the first access information and the connection information be highly versatile information.

While specific embodiments of the present invention have been described in detail above, such description is for illustrative purposes only and is not intended to limit the scope and claims of the invention. Techniques described in the claims of the invention include various modifications and changes made to the specific examples illustrated above. Variants according to the above embodiments are listed below.

Modifications

The first access information and the connection information may be included in the code 140. In S10, the user may use the camera unit 27 to photograph the code 140 printed on the housing of the printer 110. In S15, the code reader application 21d may perform image recognition processing on the image data of the code 140, analyze the image data of the code 140, and extract the first access information and the connection information embedded in the code 140.

In S165 and S175, the process executed by the print/scan application 21a is not restricted to the print process. Any process which can be executed by the MFP 110 and the Wi-Fi communication 201 is an executable process. For example, in S165, the mobile phone 10 may send an instruction to execute a scan process to the MFP 110. In S170, the MFP 110 may scan a document using the scan performing unit 125, and generate scan data. Then, the mobile phone 10 may receive the scan data from the MFP 110 via the Wi-Fi communication 201.

Various information, not restricted to the connection information, can be stored temporarily in the transfer server 60 (S45). That is, the concept of the technique described in the present specification is as follows. "In a case of receiving data including predetermined information (S15) before an application program capable of processing the predetermined information is installed in the storage unit 12 (S100), the data is stored in the transfer server 60. After installation of the application program has been completed, the mobile phone 10 receives the predetermined information from the transfer server 60.".

The transfer server 60 may erase the connection information stored in the storage table 75 in S45 in case a predetermined condition is fulfilled. An example of the predetermined condition is a predetermined time, determined in advance, elapsing since the sending of the tag data was performed (S35). As a result, the free capacity of the storage table 75 can constantly be ensured.

The steps S70 to S95 may be performed by the appl. obtaining application 21c and not the browser application 21b. In this case, when receiving the second access information (S55), the browser application 21b transfers the second access information to the OS21e. The OS21e outputs a start instruction to the appl. obtaining application 21c. The appl. obtaining application 21c which has started executes the processes of S70 to S95. As a result, it is possible to reduce the processing load of the browser application 21b.

According to the above, in general terms, the computer-readable instructions simply needs to cause the mobile phone 10 to perform "the obtaining", "the sending of first information", "the receiving of identification information", "the storing", "the sending of the access request information", "the downloading", "the installing", "the accepting", "the sending of the identification information", "the receiving of the first information", "the establishing", and "the executing". As a specific example, the mobile phone 10 may execute at least S15, S35, S55, S60, S70, S95, S100, S105, S135, S145, S150, S153, and S165.

The connection information is not restricted to the SSID and password used for executing the Wi-Fi communication 201, but may include various information. For example, information used for executing a Wi-Fi communication via an access point may be included. A specific example of the information is an IP address on a local network, used for identifying a device. Further, the connection information may include a MAC address or other parameters.

The OS21e is not restricted to Android. The OS21e may be iOS (registered trademark of Cisco Systems, Inc.), Windows Phone (registered trademark of Microsoft Corporation), etc.

The code 140 is not restricted to a matrix type two-dimensional code such as a QR code. The code 140 may be a one-dimensional code such as a bar code.

Instead of executing the NFC communication 200, the MFP 110 and the mobile phone 10 may execute a near field wireless communication of another communication procedure (e.g., a wireless communication of the TransferJet (trademark of TransferJet Consortium) technique, infrared communication, etc.). Further, instead of executing the NFC communication 200, the MFP 110 and the mobile phone 10 may execute a Wi-Fi technique wireless communication. Further, instead of a wireless communication, the MFP 110 and the mobile phone 10 may execute a wired communication. Generally speaking, the mobile phone 10 and the MFP 110 may be capable of any communication.

The mobile phone 10 may execute a Wi-Fi technique wireless communication, and execute the communication of various information with the content server 100. Further, in the case of being connected to the Internet 50 by wire, the mobile phone 10 may execute a wired communication to execute a communication with the content server 100. Generally speaking, the mobile phone 10 and the content server 100 may be capable of any communication.

In the case of being connected to the Internet by wire, the MFP 110 may execute a wired communication to execute a communication of various information with the content server 100. Generally speaking, the MFP 110 and the content server 100 may be capable of any communication.

The device in which the print/scan application 21a operates may not be the mobile phone 10, but may be a tablet terminal device or a notebook PC.

Figure 2:
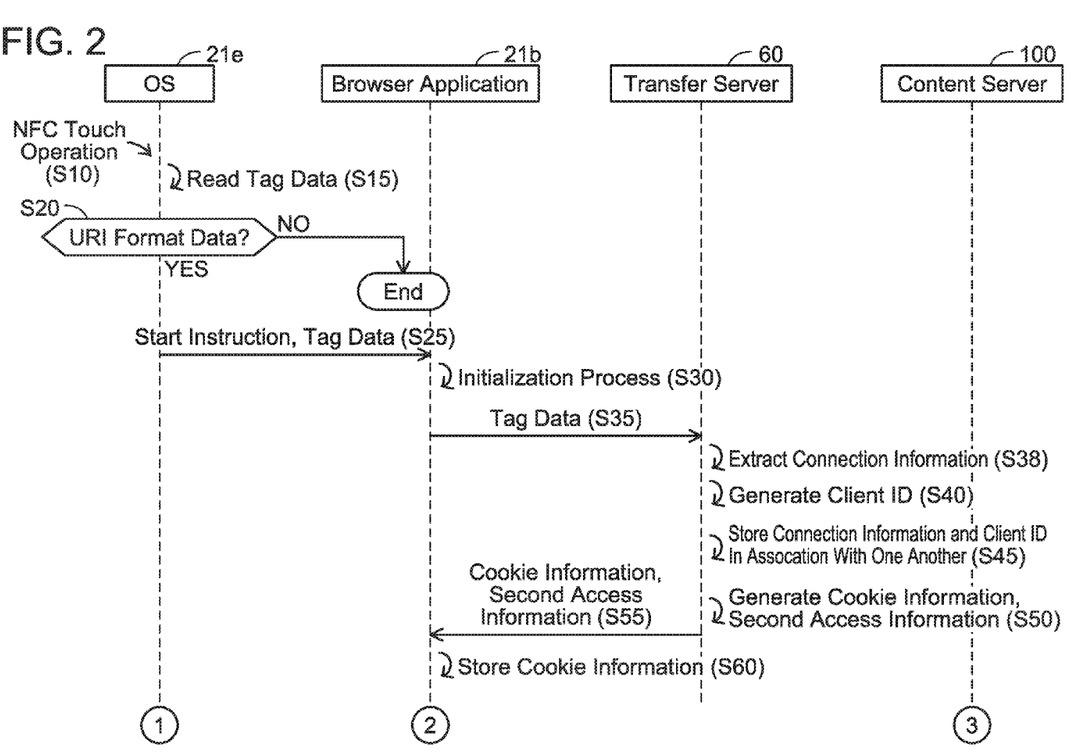
FIG. 2 shows a sequence diagram for explaining operation of the communication system.
Figure 3:
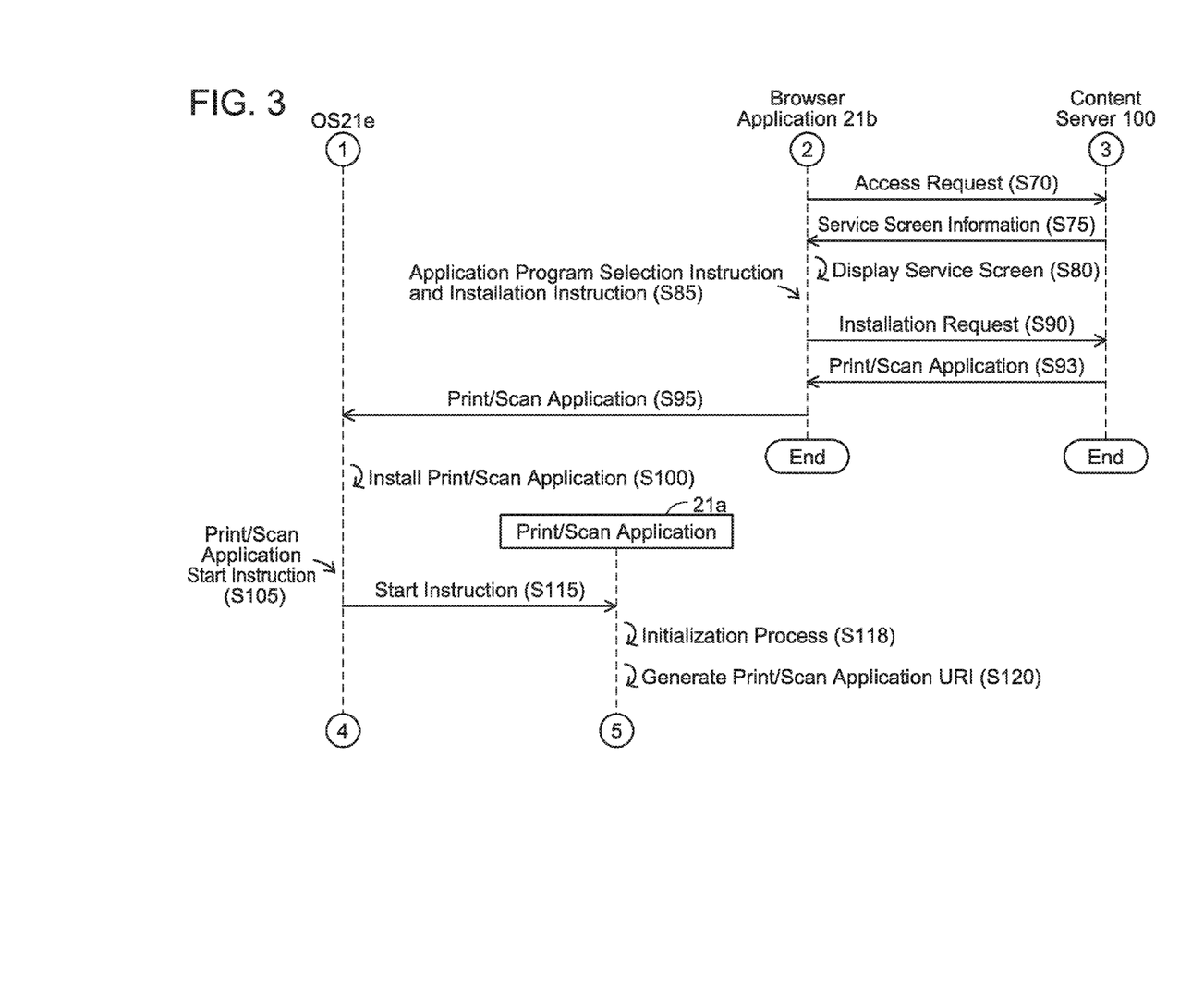
FIG. 3 shows a sequence diagram for explaining operation of the communication system.
Figure 4:
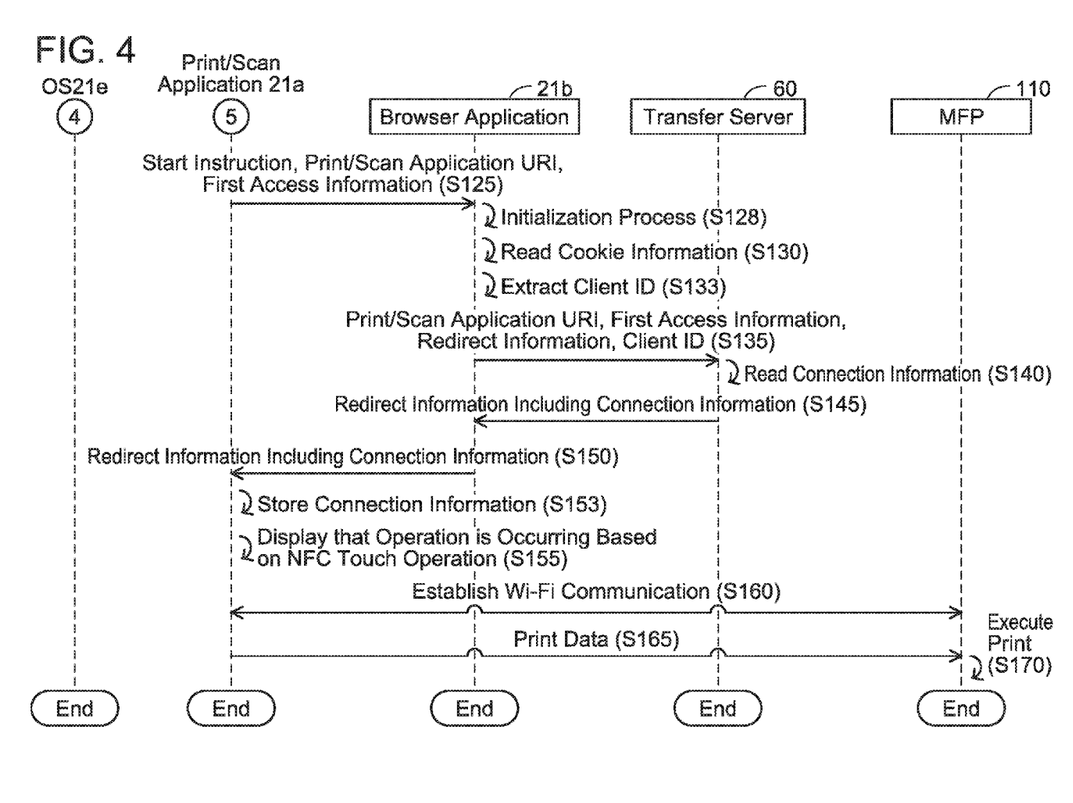
FIG. 4 shows a sequence diagram for explaining operation of the communication system.

In the embodiment described above, the CPU 11 of the mobile phone 10 realizes the processes of FIG. 2 to FIG. 4, etc. by executing the programs in the storage unit 12. Instead, at least one of the processes of FIG. 2 to FIG. 4, etc. may be realized by hardware such as a logic circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

(Correspondence Relationship)

The transfer server 60 is an example of "first server". The print/scan application 21a is an example of "application program". The content server 100 is an example of "second server". The MFP 110 is an example of "external device". The mobile phone I/F 22 and the wireless LAN_I/F 16 are examples of "communication interface". The NFC tag 116 and the code 140 are examples of "target object". The connection information is an example of "first information". S15 is an example of "obtaining". The CPU 11 is an example of "processor". S35 is an example of "obtaining". The client ID is an example of "identification information". S55 is an example of "receiving the identification information". S60 is an example of is an example of "storing". S70 is an example of "sending an access request information". S95 is an example of "downloading". S100 is an example of "installing". S135 is an example of "sending the identification information". S145, S150, S153 are examples of "receiving the first information". S165 is an example of "establishing". The browser application 21b is an example of "browser program". The redirect information is an example of "designation information". The NFC_I/F 15 is an example of "receiver configured for a near field communication". The camera unit 27 and the code reader application 21d are examples of "reader".

What is claimed is:

1. An information processing device, comprising:
    a communication interface configured to communicate with a transfer server, a content server that stores a print/scan application, and an external device;
    a storage;
    a processor coupled to the communication interface; and
    a memory storing computer-readable instructions,
    wherein the computer-readable instructions, when executed by the processor, cause the information processing device to perform:
        obtaining, from a target object, a first access information and a connection information, the first access information indicating a location of the transfer server, wherein the target object is a near field communication device or a code diagram;
        sending the obtained connection information to the transfer server via the communication interface, using the first access information;
        receiving, from the transfer server via the communication interface, a client ID and second access information in response to sending the connection information to the transfer server, the client ID being unique to the connection information, the second access information indicating a location of the content server;
        storing the received client ID in the storage;
        sending an access request information to the content server via the communication interface, using the second access information;
        downloading the print/scan application from the content server via the communication interface after sending the access request information;
        installing the print/scan application that has been downloaded;
        accepting an input of an instruction for activating the print/scan application that has been installed;
        sending the client ID that has been stored in the storage to the transfer server via the communication interface, using the first access information;
        receiving, from the transfer server via the communication interface, the connection information unique to the client ID in response to sending the client ID to the transfer server;
        establishing a connection with the external device, by using the connection information, by the print/scan application; and
        executing a communication processing by using the established connection.

2. The information processing device as in claim 1, wherein
    a browser program is installed in the information processing device,
    the browser program causes the information processing device to perform the sending of the connection information, the receiving of the client ID, the storing of the client ID, the accepting of the input of the instruction for activating the print/scan application, the sending of the client ID, and the receiving of the connection information,
    wherein the client ID is a cookie information to be used in the browser program.

3. The information processing device as in claim 1, wherein
    in the sending of the client ID, designation information is further sent to the transfer server via the communication interface, the designation information designating in advance that processing based on the connection information is to be performed in the print/scan application, and the designation information including the connection information,
    in the receiving of the connection information, the designation information is further received from the transfer server via the communication interface, and
    in the execution of the communication processing, the processing based on the connection information included in the designation information is executed in the print/scan application.

4. The information processing device as in claim 1, wherein
    the external device comprises an image processing function,
    in the execution of the communication processing, sending processing and receiving processing of image data between the external device and the information processing device is executed in the print/scan application.

5. The information processing device as in claim 1, further comprising a receiver configured for near field wireless communication,
    wherein in the obtaining of the first access information and the connection information, the first access information and the connection information are received via the receiver.

6. The information processing device as in claim 1, further comprising a reader configured to read the code diagram indicating specific data,
    wherein in the obtaining of the first access information and the connection information, the first access information and the connection information are obtained by reading with the reader the code diagram including the first access information and the connection information.

7. The information processing device as in claim 1, wherein the first access information and the connection information are described in a form of a Uniform Resource Locator.

8. A method for controlling an information processing device, the information processing device comprising:
    a communication interface configured to communicate with a transfer server, a content server storing a print/scan application, and an external device;
    a processor coupled to the communication interface; and
    a storage in which an operating system has been installed in advance, wherein the operating system stored in the storage, when executed by the processor, causes the information processing device to perform:
    obtaining, from a target object, first access information and connection information, the first access information indicating a location of the transfer server, wherein the target object is a near field communication device or a code diagram;
    sending the obtained connection information to the transfer server via the communication interface, using the first access information;
    receiving, from the transfer server via the communication interface, client ID and second access information in response to sending the connection information to the transfer server, the client ID being unique to the connection information, the second access information indicating a location of the content server;
    storing the received client ID in the storage;
    sending an access request information to the content server via the communication interface, using the second access information;
    downloading the print/scan application from the content server via the communication interface after sending the access request information; and
    installing the print/scan application that has been downloaded, wherein the installed print/scan application, when executed by the processor, causes the information processing device to perform:
    accepting an input of an instruction for activating the print/scan application that has been installed;
    sending the client ID that has been stored in the storage to the transfer server via the communication interface, using the first access information;
    receiving, from the transfer server via the communication interface, the connection information unique to the client ID in response to sending the client ID to the transfer server;
    establishing a connection with the external device, by using the received connection information, by the print/scan application; and
    executing a communication processing by using the established connection.

9. A communication system comprising an image processing device, a transfer server, a content server storing a print/scan application, and an external device, the information processing device is configured to perform:
    obtaining, from a target object, first access information and connection information, the first access information indicating a location of the transfer server, wherein the target object is a near field communication device or a code diagram; and
    sending the obtained connection information to the transfer server via a first communication interface of the information processing device, using the first access information, the transfer server is configured to perform:
    generating client ID unique to the first information in response to receiving the connection information from the information processing device;
    storing, in a first storage of the transfer server, the generated client ID and the received connection information in association with each other; and
    sending the generated client ID and second access information indicating a location of the content server to the information processing device via a second communication interface of the transfer server, the information processing device is configured to further perform:
    storing the client ID that has been received from the transfer server in a second storage of the information processing device; and
    accessing the content server via the first communication interface, using the second access information that has been received from the transfer server, the content server is configured to perform sending the print/scan application to the information processing device via a third communication interface of the content server in a case where the content server is accessed by the information processing device, the information processing device is configured to further perform:
    installing the print/scan application that has been received from the content server in the second storage; and
    accepting an input of an instruction for activating the installed print/scan application;
    sending the client ID stored in the second storage to the transfer server via the first communication interface, using the first access information, the transfer server is configured to further perform:
    reading the connection information unique to the received client ID from the first storage in response to receiving the client ID from the information processing device; and
    sending the read connection information to the information processing device via the second communication interface,
    the information processing device is configured to further perform:
        establishing a connection with the external device using the connection information that has been received from the transfer server; and
        executing communication processing by using the established connection.

10. The information processing device as in claim 1, wherein the near field communication device is a near field communication tag.

11. The method as in claim 8, wherein the near field communication device is a near field communication tag.

12. The communication system as in claim 9, wherein the near field communication device is a near field communication tag.

* * * * *